(12) United States Patent
Feng et al.

(10) Patent No.: US 8,423,503 B2
(45) Date of Patent: Apr. 16, 2013

(54) KNOWLEDGE ANNOTATION RESULT CHECKING METHOD AND SYSTEM

(75) Inventors: Qiangze Feng, Beijing (CN); Toshikazu Fukushima, Beijing (CN); Hongwei Qi, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 297 days.

(21) Appl. No.: 12/634,337

(22) Filed: Dec. 9, 2009

(65) Prior Publication Data

US 2010/0198831 A1 Aug. 5, 2010

(30) Foreign Application Priority Data

Feb. 3, 2009 (CN) .......................... 2009 1 0005716

(51) Int. Cl.
*G06F 17/30* (2006.01)
(52) U.S. Cl.
USPC ............................ 707/603; 707/602; 707/793
(58) Field of Classification Search .................. None
See application file for complete search history.

(56) References Cited

U.S. PATENT DOCUMENTS

| | | | |
|---|---|---|---|
| 7,865,356 B2 * | 1/2011 | Weng et al. ........................ 704/9 |
| 2001/0052004 A1 * | 12/2001 | Stollfus et al. ................. 709/220 |
| 2004/0243554 A1 | 12/2004 | Broder et al. |

FOREIGN PATENT DOCUMENTS

| | | | |
|---|---|---|---|
| JP | 2003162518 A | 6/2003 |
| JP | 2003167879 A | 6/2003 |
| JP | 2005038050 A | 2/2005 |
| JP | 2006215823 A | 8/2006 |
| JP | 2007094855 A | 4/2007 |
| JP | 2008021139 A | 1/2008 |

OTHER PUBLICATIONS

Belhajjame, Khalid et al., 2008. Automatic annotation of Web services based on workflow definitions. ACM Trans. Web 2, 2, Article 11 (May 2008), 34 pages. DOI=10.1145/1346237.1346239 http://doi.acm.org/10.1145/1346237.1346239.*
Lee, Cheng-Yu et al., The conflict detection and resolution in knowledge merging for image annotation, Information Processing & Management, vol. 42, Issue 4, Jul. 2006, pp. 1030-1055, ISSN 0306-4573, 10.1016/j.ipm.2005.09.004. (http://www.sciencedirect.com/science/article/pii/S0306457305001305).*
Kiyavitskaya, N. et al., 2005. Semi-Automatic Semantic Annotations for Web Documents. Communication, 15. Citeseer. Retrieved from http://citeseerx.ist.psu.edu/viewdoc/summary?doi=10.1.1.60. 1322.*
Yang, S. An Ontology-Supported and Fully-Automatic Annotation Technology for Semantic Portals. In Proceedings of IEA/AIE. 2007, 1158-1168.*
Japanese Office Action dated May 15, 2012 issued by the Japanese Patent Office in corresponding Japanese Patent Application No. 2009-279845.

* cited by examiner

*Primary Examiner* — Syed Hasan
(74) *Attorney, Agent, or Firm* — Sughrue Mion, PLLC (57) ABSTRACT

The present invention discloses a knowledge annotation result checking system and method. The knowledge annotation result checking system comprises: a receiving unit for receiving a knowledge annotation result; and a checking unit, for comparing the received knowledge annotation result with information within a tag registration database to obtain comparison information. According to the present invention, inconsistent tag information can be detected.

6 Claims, 10 Drawing Sheets

| Tag 210 | Knowledge annotation engine 212 |
|---------|-------------------------------|
| Company | Company annotation engine |
| Address | Company annotation engine |
| Telephone | Company annotation engine |
| Weight | Company annotation engine |
| Price | Product annotation engine |
| Product | Product annotation engine |

```
Defontology  class part  410                    Defontology relationship part 430
{                                               {
       class: company                                  relationship: is a
             : is a geographical entity                      : domain   any class, any individual
       class: product                                        : range    any class
             : is an article                          relationship: is manufactured
}                                                            : domain   product
Defontology property part 420                                : range    company
{
       property: address                        }
             : domain    company                Defontology  individual part   440
             : range     string                 {
       property: telephone                             individual:  IBM T61 7664-BB1
             : domain    company                             : is a product
             : range     numeric                             : is manufactured     IBM
       property: weight                                      : price   12000~15000   Yuan
             : domain    company
             : range     numeric
       property: price                          Defontology axiom part   450
             : domain    product                {
             : range     numeric                       axiom: is a (x,y)&is a (y,z)->is a (x,z)
}                                               }
```

KNOWLEDGE ANNOTATION RESULT CHECKING METHOD AND SYSTEM

FIELD OF THE INVENTION

The present invention relates to the field of knowledge extraction, and more particularly, to a knowledge annotation result checking system and method.

BACKGROUND OF THE INVENTION

The knowledge extraction extracts structured information from unstructured information, for example, extracts company information, product information and the like from one HTML file. A knowledge extraction task may involve one or more knowledge annotation engines of which each can annotate source information as related one or more tags. For example, a company annotation engine can annotate "NEC" in the text "NEC has proposed latest storage product Storage D series" as a "company" tag, and a product annotation engine can annotate "Storage D" therein as a "product" tag.

However, it is impossible to require accuracy of a knowledge annotation engine to be 100%, and the knowledge annotation engine might output an inconsistent tag, for example, the company annotation engine perhaps outputs a "price" tag which is supposed to be output by the product annotation engine.

Therefore, it is desirable for a knowledge annotation result checking system solution which can detect inconsistent tag information.

There have been several related patents and researches.

In US20040243554, an unstructured information management and text analysis system is described. It emphasizes particularly on a method of annotating texts, and gives a group of knowledge annotation engines.

In JP2003167879, a device of searching and displaying annotation information is described. It focuses more on a method of presenting annotation results, which more particularly includes extracting corresponding annotation results from a document with annotations and displaying them based on query requests from users.

In JP2008021139, a device for constructing models of semantic annotations is described. It lays particular emphasis on a method of annotating texts, which in particular includes annotating texts semantically by means of ontology and statistic methods with accuracy.

However, the present technologies pay more attention on the method of annotating texts and presenting the annotation results, leading to the lack of a solution of checking annotation results automatically.

SUMMARY OF THE INVENTION

The present invention provides a knowledge annotation result checking solution which can detect inconsistent tag information.

According to an aspect of the present invention, there is provided a knowledge annotation result checking system, comprising: a receiving unit, for receiving a knowledge annotation result; and a checking unit, for comparing the received knowledge annotation result with information within a tag registration database to obtain comparison information.

According to another aspect of the present invention, there is provided a knowledge annotation result checking method, comprising: receiving a knowledge annotation result; and comparing the received knowledge annotation result with information within a tag registration database to obtain comparison information.

BRIEF DESCRIPTION ON THE DRAWINGS

Hereinafter, other objects and effects will become more apparent and accessible along with full understanding of the present invention with reference to the drawings wherein.

Identical reference numbers refer to identical, similar or corresponding features or functions throughout the drawings.

DESCRIPTION OF THE PREFERRED EMBODIMENTS

Figure 1A:
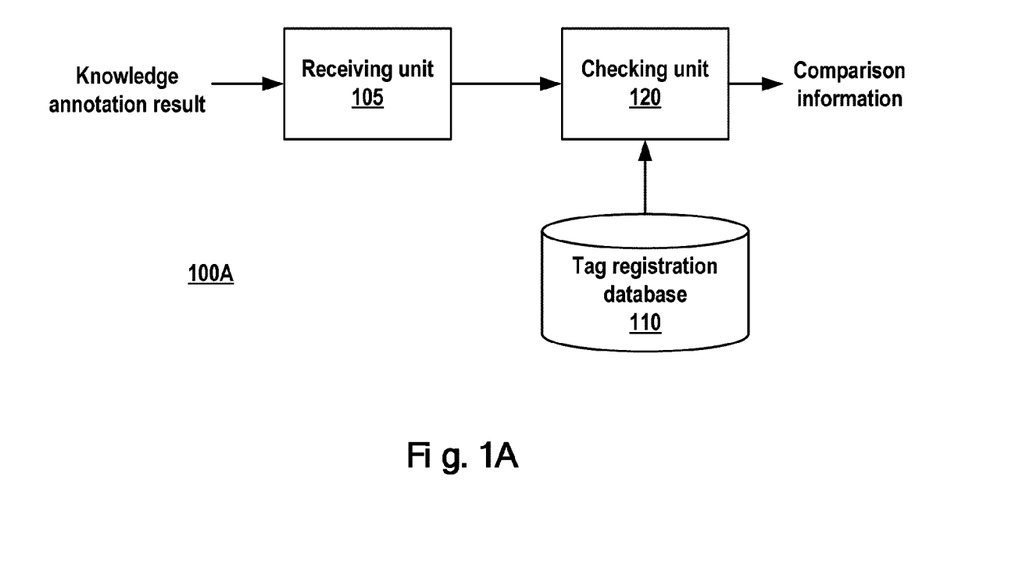
FIG. 1A shows a block diagram of a system for checking the knowledge annotation result according to an embodiment of the present invention.

FIG. 1A shows a block diagram of a system for checking the knowledge annotation result according to an embodiment of the present invention.

As shown in FIG. 1A, a knowledge annotation result checking system 100A comprises: a receiving unit 105 for receiving a knowledge annotation result; a tag registering database 110 for storing corresponding information and a checking unit 120 for comparing the received knowledge annotation result with information within a tag registration database to obtain comparison information. Among other things, the knowledge annotation result at least comprises a tag and a knowledge annotation, and the tag registration database 110 comprises tags and knowledge annotation engines using these tags. The checking unit 120 obtains comparison information at least by comparing the tag and knowledge annotation engine in the knowledge annotation result with tags and knowledge annotation engines within the tag registration database 110. The comparison information is inconsistent tag information.

Figure 2:
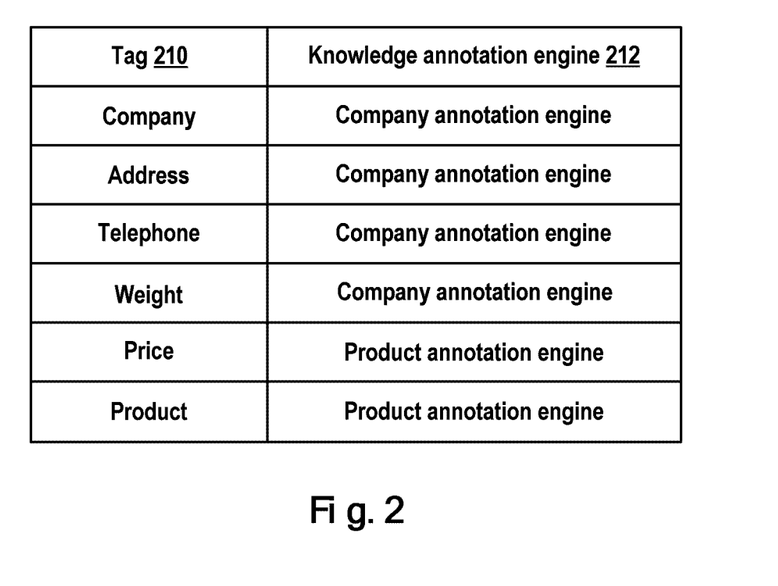
FIG. 2 shows entries stored in a database and comprising tags and knowledge annotation engines.

FIG. 2 shows information comprising tags and knowledge annotation engines using these tags and stored in the tag registration database 110. Each entry (each row) comprises a "tag" (column 210) and a "knowledge annotation engine" (column 212), indicating the name of tag and knowledge annotation engines using this tag, respectively. For instance, a knowledge annotation engine using the "company" tag is the "company annotation engine", and a knowledge annotation engine using the "product" tag is the "product annotation engine", and the like.

The task of the checking unit 120 is to check whether a knowledge annotation result includes tag information inconsistent with an entry comprising a tag and a knowledge annotation engine with in the tag registration database 110.

If the tag in the knowledge annotation result does not occur in the tag registration database 110, there is inconsistent tag information of which an inconsistent type is "new tag".

If the knowledge annotation engine in the tag registration database 110 corresponding to the tag in the knowledge annotation result does not include the knowledge annotation engine in the knowledge annotation result corresponding to the tag, there is inconsistent tag information of which the inconsistent type is "tag use error".

Figure 3:
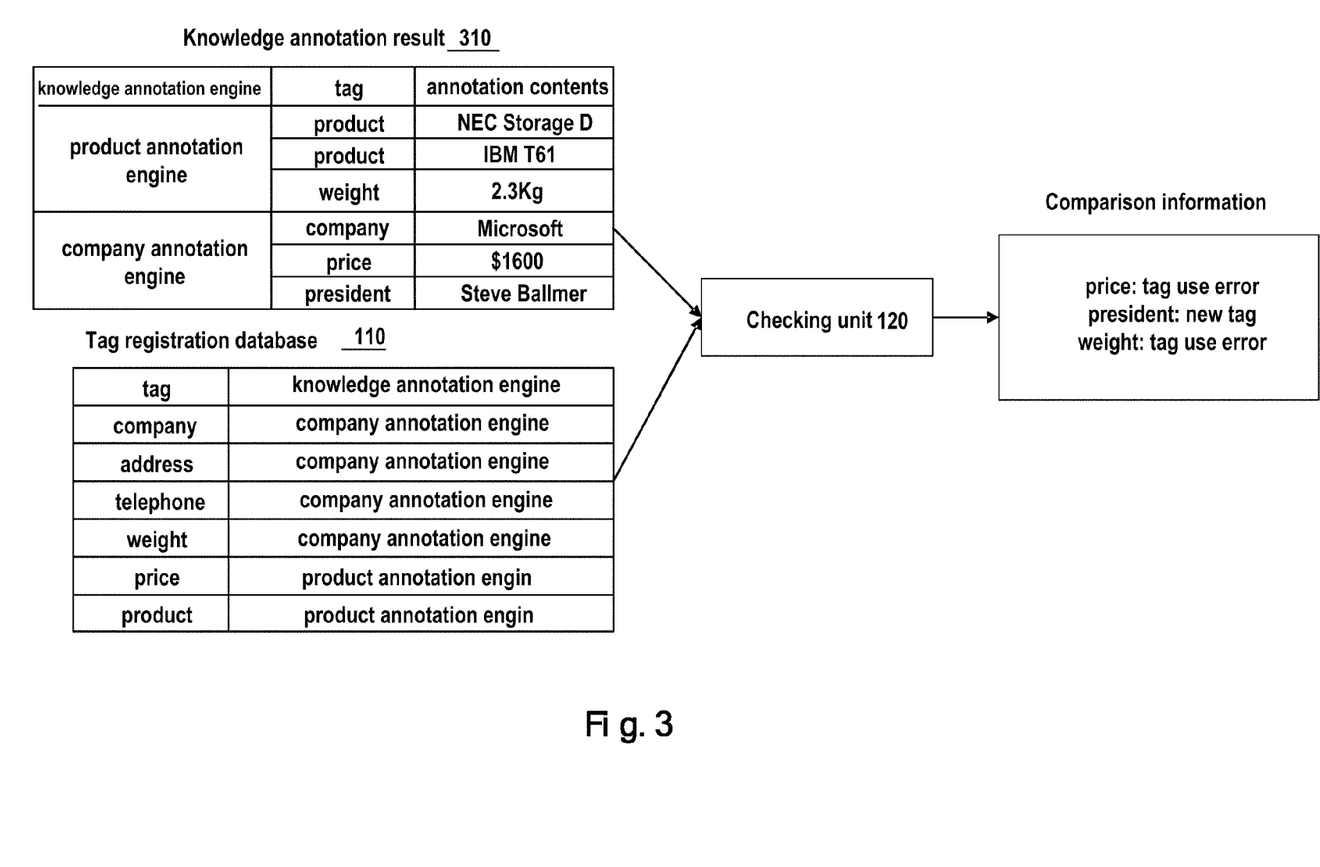
FIG. 3 shows an example of checking knowledge annotation results.

FIG. 3 shows an example of checking knowledge annotation results.

In a knowledge annotation result 310, the product annotation engine outputs three tags, product, product and weight, and the company annotation engine outputs three tags, company, price and president. The knowledge annotation engine in the tag registration database 110 corresponding to the "product" tag is also the "product annotation engine", and thus the checking unit 120 considers it as a consistent tag. The knowledge annotation engine in the tag registration database 110 corresponding to "weight" is "company annotation engine", and hence the checking unit 120 considers it as an inconsistent tag, and its inconsistent type is "tag use error". The knowledge annotation engine in the tag registration database 110 corresponding to the "company" is also the "company annotation engine", and thus the checking unit 120 considers it as a consistent tag. The knowledge annotation engine in the tag registration database 110 corresponding to "price" is "company annotation engine", and hence the checking unit 120 considers it as an inconsistent tag, and its inconsistent type is "tag use error". There is no knowledge annotation engine in the tag registration database 110 corresponding to the "president", and therefore the checking unit 120 considers it as inconsistent tag, and its inconsistent type is "new tag".

The checking unit 120 can inform the user of the inconsistent tag information.

Figure 1B:
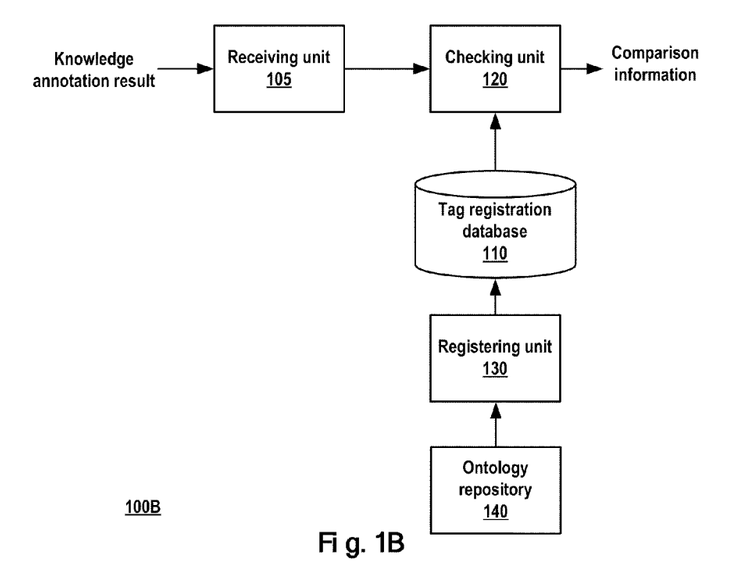
FIG. 1B shows a block diagram of a system for checking the knowledge annotation result according to another embodiment of the present invention.

FIG. 1B shows a block diagram of a system for checking the knowledge annotation result according to another embodiment of the present invention.

The difference between a knowledge annotation result checking system 100B in this embodiment and the above-described knowledge annotation result checking system 100A lies in that the knowledge annotation result checking system 100B further comprises a registering unit 130 for registering tags used by the respective knowledge annotation engines to the tag registration database 110; and an ontology repository 140 for storing domain knowledge.

Figure 4:
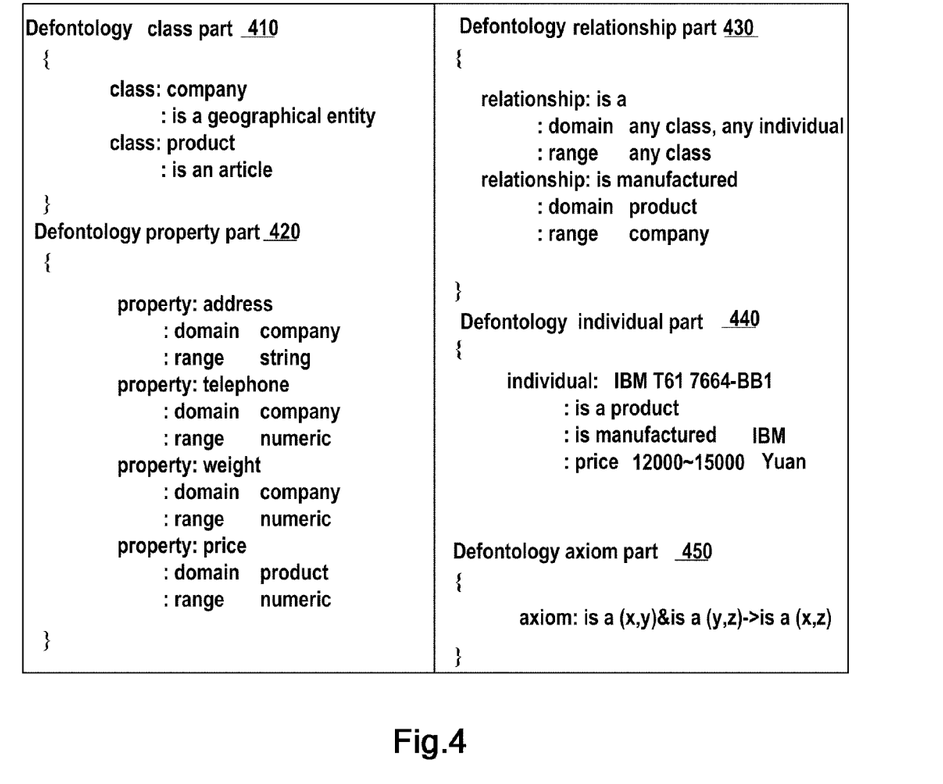
FIG. 4 shows an example of an ontology repository.

FIG. 4 shows an example of the ontology repository. The ontology repository 140 includes five parts, a class part 410, a property part 420, a relationship part 430, an individual part 440 and an axiom part 450.

The class part 410 includes all domain classes, such as company, product. A class is not a real entity, but an abstracted concept. Each class has an item "is a/an" to indicate a parent class of the class. For example, the parent class of "company" is a "geographical entity", that is, "a company is a geographical entity". For example, the parent class of "product" is an "article", that is, "a product is an article".

The properties in the property part 420 define the property of a class. Each property at least has two items, a "domain" and a "range". The "domain" shows which classes a property is applicable to, that is, which classes have the property, and the "range" shows the value type of the property. For instance, a property "address" is suitable for a class "company", and the property value is a string. As another example, the "price" is suitable for a class "company", and the property value is a numeric.

A relationship in the relationship part 430 describes various associations among classes. Each relationship at least includes two items, a "domain" and a "range" to show which classes two parties of a relationship can be. As an example, there can be a "is a/an" relationship between any class or individual and any class, such as, there can be a "is manufactured" relationship between a product and a company.

An individual in the individual part 440 is a real entity. Every individual belongs to a certain class, and describes values of each property and relationship. For example, "IBM T61 7664-BB1" belongs to the product class and is manufactured by IMB, and the price thereof is 12000-45000 Yuan.

The axiom part 450 is a reasoning which can be further done based on rules among classes, individuals and relationships. An example is "is a (x, y) & is a (y, z)→is a (x, z)". For example, IBM T61 7664-BB1 is a product and a product is an article, and then it can be reasoned that IBM T61 7664-BB1 is also an article. Rules in the axiom part are generally limited, which can be expanded according to requirements.

The ontology repository 140 can be established and maintained by a domain developer automatically or manually.

In the embodiment of the present invention, the registering unit 130 maps the knowledge annotation engine to a corresponding class within the ontology repository 140 according to the functional description or name of the knowledge annotation engine (provided by developers of the knowledge annotation engine). For example, a functional description of a knowledge annotation engine is annotation "product" information, and thus the knowledge annotation engine is mapped to a "product" class in the ontology repository 140. As another example, the name of a knowledge annotation engine is "company annotation engine", and hence the knowledge annotation engine is mapped to the "company" class in the ontology repository 140. And further, the registering unit 130 extracts the corresponding class within the ontology repository and all properties of the corresponding class as a tag set, which can be output by the knowledge annotation engine, for registering tags used by the respective knowledge annotation engines to the tag registration database 110.

Figure 5:
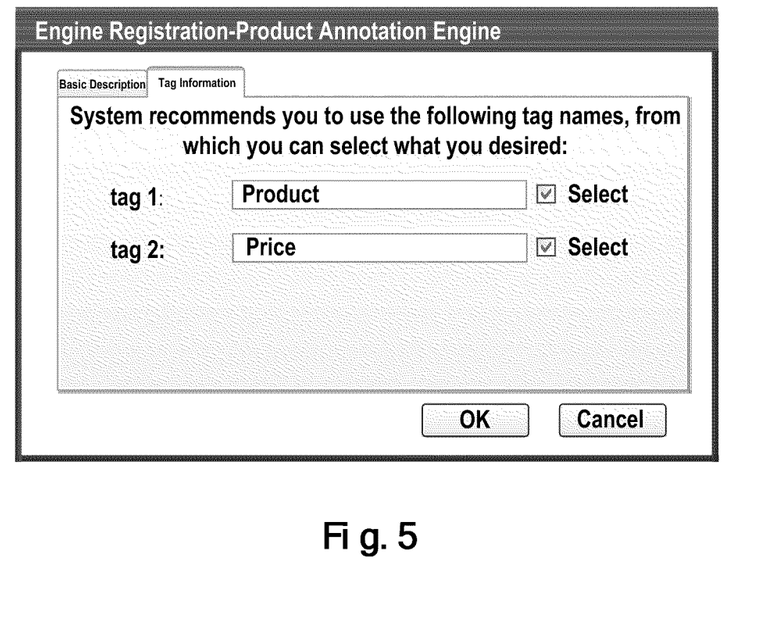
FIG. 5 shows a registering interface according to an embodiment of the present invention.

In another embodiment of the present invention, the registering unit 130 maps a knowledge annotation engine to a corresponding class within the ontology repository 140 according to the functional description or name of the knowledge annotation engine, extracts the corresponding class and all properties of the corresponding class within the ontology repository 140 as a candidate tag set which can be output by the knowledge annotation engine and to be provided to a user, and registers tags used by the respective knowledge annotation engines to the tag registration database 110 based on the user's selection of the tags in the candidate tag set. FIG. 5 shows a registering interface according to the embodiment. When registering the product annotation engine, the system first gives a user two candidate tags in accordance with the ontology repository, product and price. Then, the user can select a tag suitable for the product annotation engine, and finally click the "OK" button to submit the registration information.

In yet another embodiment, the registering unit 130 registers tags used by the respective knowledge annotation engines to the tag registration database 110 according to a tag set which can be output by the knowledge annotation engine and is provided by an user through referring to the ontology repository 140.

Figure 1C:
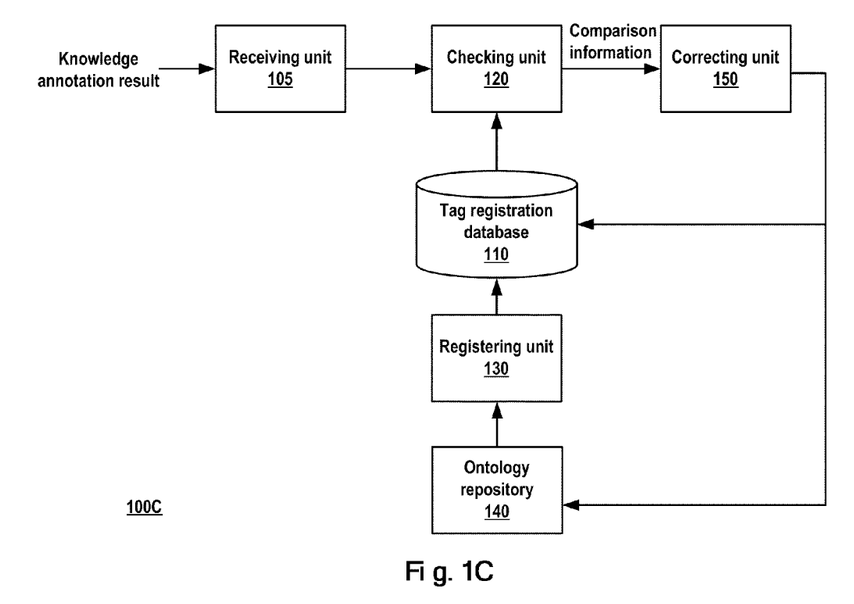
FIG. 1C shows a block diagram of a system for checking the knowledge annotation result according to yet another embodiment of the present invention.

FIG. 1C shows a block diagram of a system for checking the knowledge annotation result according to yet another embodiment of the present invention.

The difference between a knowledge annotation result checking system 100C in this embodiment and the above-described knowledge annotation result checking system 100B lies in that the knowledge annotation result checking system 100C further comprises a correcting unit 150 for correcting correspondences between tags and knowledge annotation engines within the tag registration database 110 and/or the ontology repository 140 based on feedback of a user on the comparison information.

If the user considers the inconsistent tag information correct, that is, the tag registration database 110 and the ontology repository 140 are correct, it is unnecessary to correct the tag registration database 110 and the ontology repository; and if the user considers the inconsistent tag information incorrect, that is, the tag registration database 110 and the ontology repository 140 are incorrect, it is necessary to correct the tag registration database 110 and the ontology repository 140.

Figure 6:
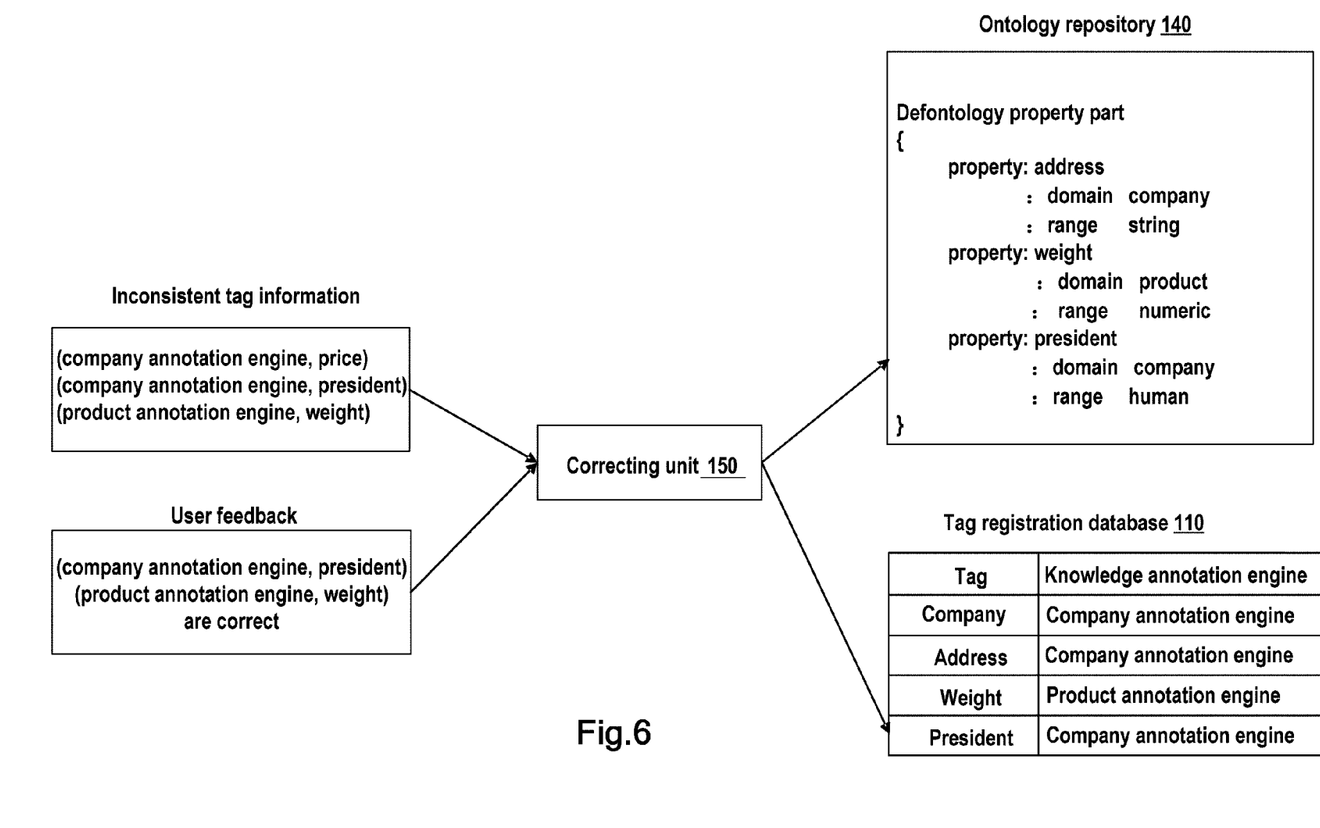
FIG. 6 shows an example of correcting a database and an ontology repository.

FIG. 6 shows an example of correcting the tag registration database 110 and the ontology repository 140. The user deems the latter two of inconsistent tag information "(company annotation engine, price)", "(company annotation engine, president)" and "(product annotation engine, weight)" correct, which should not occur in the inconsistent tag information. Hence, the correcting unit 150 adds a new property "president" of the "company" class to the ontology repository 140 and adds a new entry "president, company annotation product" to the tag registration database 110; amends the domain of the property "weight" in the ontology repository 140 from "company" into "product", and amends the knowledge annotation engine corresponding to the tag "weight" from "company annotation engine" into "product annotation engine" in the tag registration database 110.

Figure 7A:
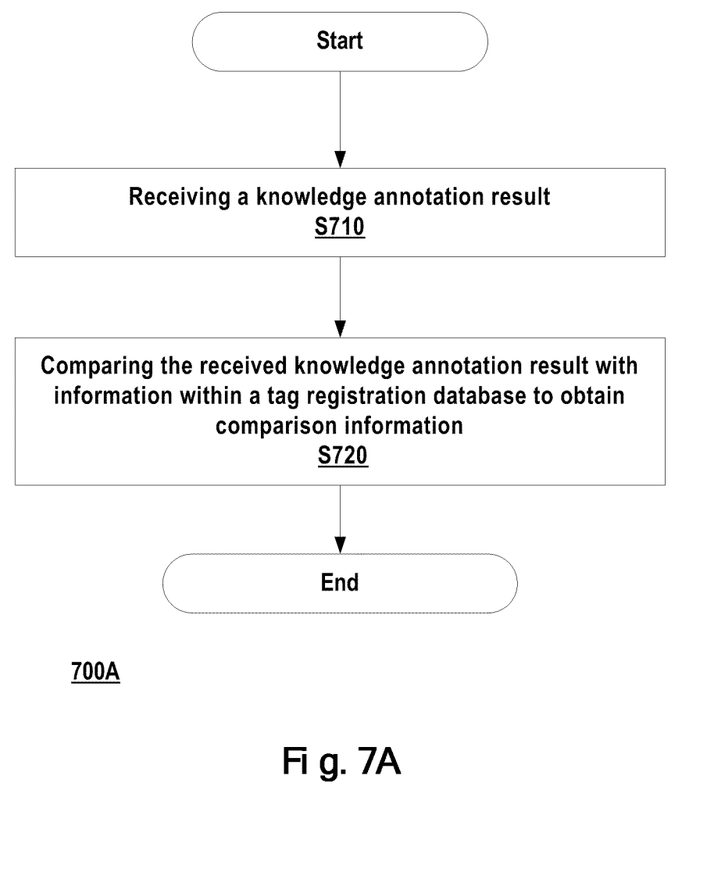
FIG. 7A shows a flow chart of a method for checking the knowledge annotation result according to an embodiment of the present invention.

FIG. 7A shows a flow chart of a method for checking the knowledge annotation result according to an embodiment of the present invention.

As shown in FIG. 7A, a method 700A comprises receiving a knowledge annotation result (step S710), and comparing the received knowledge annotation result with information within a tag registration database to obtain comparison information (step S720). The knowledge annotation result at least comprises a tag and a knowledge annotation; and the tag registration database comprises tags and knowledge annotation engines using these tags. The comparison information is obtained at least by comparing the tag and knowledge annotation engine in the knowledge annotation result with tags and knowledge annotation engines within the tag registration database. The comparison information is inconsistent tag information.

Figure 7B:
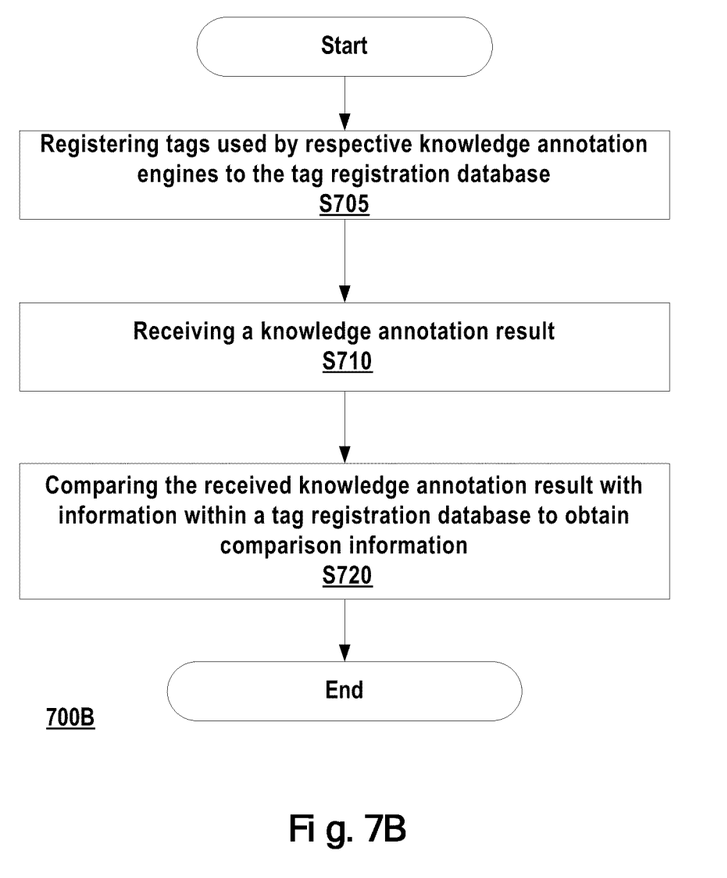
FIG. 7B shows a flow chart of a method for checking the knowledge annotation result according to another embodiment of the present invention.

FIG. 7B shows a flow chart of a method for checking the knowledge annotation result according to another embodiment of the present invention.

The difference between the knowledge annotation result checking method 700B in the embodiment and the above-described knowledge annotation result checking method 700A lies in that the knowledge annotation result checking method 700B further comprises registering tags used by the respective knowledge annotation engines to the tag registration database (step S705) before the step S710.

In the embodiment of the present invention, a knowledge annotation engine is mapped to a corresponding class within the ontology repository according to the functional description or name of the knowledge annotation engine, and the corresponding class and all properties of the corresponding class within the ontology repository are extracted as a tag set of the knowledge annotation engine for registering tags used by the respective knowledge annotation engines to the tag registration database.

In another embodiment of the present invention, a knowledge annotation engine is mapped to a corresponding class within the ontology repository according to the functional description or name of the knowledge annotation engine, the corresponding class and all properties of the corresponding class within the ontology repository are extracted as a candidate tag set of the knowledge annotation engine to be provided to a user, and tags used by the respective knowledge annotation engines are registered to said tag registration database based on the user's selection of the tags in the candidate tag set.

In yet another embodiment of the present invention, tags used by the respective knowledge annotation engines are registered to the tag registration database according to a tag set which can be output by a knowledge annotation engine and which is provided by a user through referring to the ontology repository.

Figure 7C:
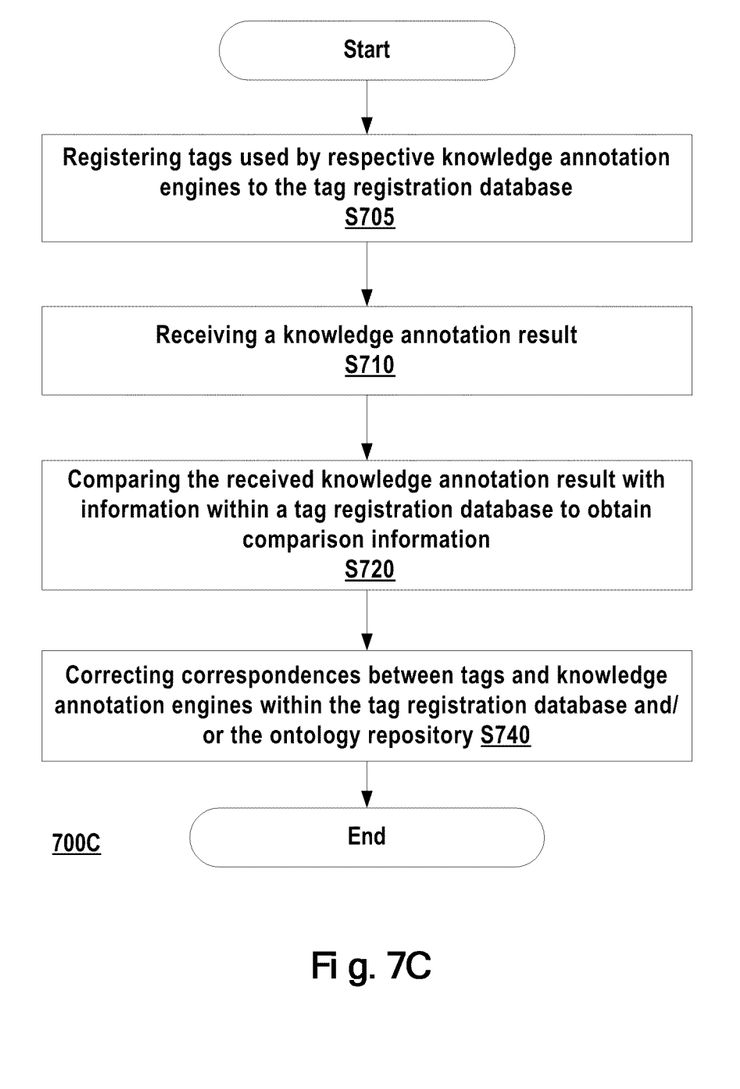
FIG. 7C shows a flow chart of a method for checking the knowledge annotation result according to yet another embodiment of the present invention.

FIG. 7C shows a flow chart of a method for checking the knowledge annotation result according to another embodiment of the present invention.

The difference between the knowledge annotation result checking method 700C in this embodiment and the above-described knowledge annotation result checking method 700B lies in that the knowledge annotation result checking method 700C further comprises correcting correspondences between tags and knowledge annotation engines within the tag registration database and/or the ontology repository based on feedback of a user on the comparison information.

The description of the present invention is provided only for illustration and description and is not exhaustive or limits the present invention to the disclosed form. It can be appreciated by the skilled in the art that there are many modifications and alternations which are all obvious. It can be further understood by the skilled in the art that method and apparatus in embodiments of the present invention can be implemented with software, hardware, firmware or their combinations. For instance, the present invention can be embodied as a computer program product comprising program codes stored on a computer-readable medium, which will perform the methods according to the embodiments of the present invention when being executed by a computer.

Hence, the embodiments are selected and described to explain the principles of the present invention and its practical applications better, and the skilled in the art should know that all modifications and alternations all fall within the protection scope of the present invention defined in the claims without departing from the essence of the present invention.

What is claimed is:

1. A knowledge annotation result checking system, comprising:
   a receiving unit configured to receive a knowledge annotation result; and
   a checking unit, implemented by a processor, configured to compare the received knowledge annotation result information within a tag registration database to obtain comparison information,
   wherein said knowledge annotation result at least comprises a tag and a knowledge annotation engine; and said tag registration, database comprises tags and knowledge annotation engines using these tags, the knowledge annotation result checking system further comprising:
a registering unit configured to register tags used by the respective knowledge annotation engines to said tag registration database,
an ontology repository, which stores domain knowledge,
wherein said registering unit maps a knowledge annotation engine to a corresponding class within the ontology repository according to the functional description or name of the knowledge annotation engine, extracts the corresponding class and all properties of the corresponding class within the ontology repository as a tag set of the knowledge annotation engine for registering tags used by the respective knowledge annotation engines to said tag registration database.

2. A knowledge annotation result checking system, comprising:
a receiving unit configured to receive a knowledge annotation result; and
a checking unit, implemented by a processor, configured to compare the received knowledge annotation result with information within a tag registration database to obtain comparison information,
wherein said knowledge annotation result at leas comprises a tag and a knowledge annotation engine; and said tag registration database comprises tags and knowledge annotation engines using these tags, the knowledge annotation result checking system further comprising:
a registering unit configured to register tags used by the respective knowledge annotation engines to said tag registration database,
an ontology repository, which stores domain knowledge,
wherein said registering unit maps a knowledge annotation engine to a corresponding class within the ontology repository according to the functional description or name of the knowledge annotation engine, extracts the corresponding class and all properties of the corresponding class within the ontology repository as a candidate tag set of the knowledge annotation engine to be provided to a user, and registers tags used by the respective knowledge annotation engines to said tag registration database based on the user's selection of the tags in the candidate tag set.

3. The system of either claim 1 or 2, further comprising:
a correcting unit, configured to correct correspondences between tags and knowledge annotation engines within the tag registration database and/or the ontology repository based on feedback of a user on the comparison information.

4. A knowledge annotation result checking method, comprising:
receiving a knowledge annotation result; and
comparing, by a processor, the received knowledge annotation result with information within a tag registration database to obtain comparison information,
wherein said knowledge annotation result at least comprises a tag and a knowledge annotation engine; and said tag registration database comprises tags and knowledge annotation engines using these tags, said knowledge annotation result checking method further comprises:
registering tags used by the respective knowledge annotation engines to said tag registration database; and wherein
a knowledge annotation engine is mapped to a corresponding class within the ontology repository according to the functional description or name of the knowledge annotation engine, and the corresponding class and all properties of the corresponding class within the ontology repository are extracted as a tag set of the knowledge annotation engine for registering tags used by the respective knowledge annotation engines to said tag registration database.

5. A knowledge annotation result checking method, comprising:
receiving a knowledge annotation result; and
comparing, by a processor, the received knowledge annotation result with information within a tag registration database to obtain comparison information,
wherein said knowledge annotation result at least comprises a tag and a knowledge annotation engine; and said tag registration database comprises tags and knowledge annotation engines using these tags, said knowledge annotation result checking method further comprises:
registering tags used by the respective knowledge annotation engines to said tag registration database; and wherein
a knowledge annotation engine is mapped to a corresponding class within the ontology repository according to the functional description or name of the knowledge annotation engine, the corresponding class and all properties of the corresponding class within the ontology repository are extracted as a candidate tag set of the knowledge annotation engine to be provided to a user, and tags used by the respective knowledge annotation engines are registered to said tag registration database based on the user's selection of the tags in the candidate tag set.

6. The method of either claim 4 or 5, further comprising:
correcting correspondences between tags and knowledge annotation engines within the tag registration database and/or the ontology repository based on feedback of a user on the comparison information.

* * * * *